Patented Sept. 12, 1933

1,926,756

UNITED STATES PATENT OFFICE 1,926,756

PROCESS OF MANUFACTURING PRIMARY AMINES

Karl Friedrich Schmidt, Ludwigshafen-on-the-Rhine, and Senta Strzygowski, Heidelberg, Germany, assignors to Knoll Aktiengesellschaft, Chemische Fabriken, a firm of Germany No Drawing. Application March 13, 1929, Serial No. 346,795, and in Germany March 13, 1923

9 Claims. (Cl. 260—130.5)

The present invention relates to the manufacture of primary amines from organic carbonic acids and derivatives thereof.

In the prior German patent specification 427,858 and 455,585, a method of introducing nitrogen into organic compounds is described, wherein the imine radical NH intermediately formed by the action of certain catalysts on hydrazoic acid is caused to act on organic compounds. In the said prior method the non-isolable imine radical aggregated or combined with hydrocarbons, such as benzene, forms aniline and analogous bases according to the equation:

$$C_6H_6 + NH = C_6H_5NH_2$$

In case of aldehydes, nitriles or the formyl compounds of the corresponding amines are formed, while ketones and cyclic ketones will lead to the formation of acid amids and lactams, respectively.

In case of compounds, which contain carboxylic groups, or derivatives thereof; such as anhydrides, esters or acid haloids, besides a carbonylic group, the imino radical at low temperature, is inert to the carboxyl groups and only reacts with the carbonyl group under formation of a reaction product, which contains the same number of carbon atoms as the primary compounds.

Now we have found carboxyl compounds or derivatives thereof, containing no carbonyl group in the molecule, react in quite a different manner with the imino radical, particularly at a temperature of about 40° C., so as to form primary amines, while carbon dioxide will be split off and evolved at the same time, according to the equation:

$$R.COOH + NH = R.NH_2 + CO_2$$

In this way products are generated, which contain at least one carbon atom less than the starting materials. It will be seen that the reaction thus leads to the very same result as the known acid disaggregation process according to Curtius.

As regards the proceedings in or during the reaction it is to be supposed that first the imine radical combines by aggregation with the carboxylic group under formation of the intermediate labile compound:

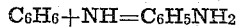

which, in valence-theoretical respects, is unsaturated and which subsequently changes to form R—CO—N< while water will be split off at the same time. Also in the theory of the Curtius disaggregation process herein before referred to residues of that type are generally supposed to be formed as intermediate products and it is also universally known that such residues are converted, in the presence of any inert medium, into isocyanates R—N—CO which in turn are split to form primary amines and carbon dioxide in the presence of water.

The proceedings, however, may alternatively be supposed to consist in that the azid of an organic acid is generated from the hydrazoic acid and the organic acid in the presence of catalysts, according to the formula:

$$R—COOH + N_3H = R—CO—N_3 + H_2O$$

and that the said azid subsequently upon splitting off one molecule of nitrogen, undergoes a Curtius decomposition to form an amine and carbon dioxide.

In carrying out the Curtius process, however, it has been absolutely necessary hitherto to transform first the acid into the acid chloride and then to treat the latter with sodium azid in order to form the azid, or else to esterify the originally used acid, any organic acid being suitable to form the hydrazid and finally the azid. These various operations required for carrying the process into effect are very troublesome and partly dangerous and the more objectionable as the yield is never satisfactory.

It is a chief object of the present invention to avoid all such troublesome and dangerous operations and with this object in view we have devised the new method which shall be described more in detail hereinafter by way of examples and wherein amines having as many carbon atoms less than carboxyl groups, of the starting compounds, or derivatives thereof, had entered into reaction are produced from organic acids or derivatives thereof in a single operation and with the result of a comparatively very large output in most cases.

Suitable catalyzers are concentrated sulphuric acid and tin tetrachloride.

We shall now proceed to describe our improved method more in detail by way of examples.

Example 1

24 grammes of benzoic acid $C_6H_5$—COOH are dissolved in 60 cubic centimetres of concentrated sulphuric acid whereupon about 50 cubic centimetres of chloroform are added to the solution to form a layer thereon, and subsequently 13 grammes of hydrazoic acid dissolved in 100 cubic centimetres of chloroform are added by drops while the solution or mixture is kept at a temperature of 40° C. Carbonic acid and nitrogen evolved in the mass are allowed to escape into the air or otherwise disposed of and when the evolution of the gases discontinues caustic potash is added to the acid layer in order to neutralize the same up to marked alkaline reaction whereafter the aniline $C_6H_5$—$NH_2$ formed is distilled off with the aid of steam. The yield amounts to 80 per cent of the theoretical output. The reaction is represented by the following equation:

$$C_6H_5.COOH + N_3H = C_6H_5.NH_2 + N_2 + CO_2$$

Example 2

27.2 grammes of phenylic acetic acid $$C_6H_5—CH_2—COOH$$

are treated in the same manner or under the same conditions as in Example 1, with hydrazoic acid. The yield of benzyl amine $$C_6H_5—CH_2—NH_2$$

amounts to 25 grammes that is 92 percent of the theoretical output.

The reaction is represented by the following equation:

$$C_6H_5—CH_2—COOH + N_3H = C_6H_5—CH_2—NH_2 + N_2 + CO_2$$

Example 3

29.2 grammes of adipic acid, $$COOH—CH_2—CH_2—CH_2—CH_2—COOH,$$

dissolved in 60 cubic centimetres of concentrated sulphuric acid are mixed, at a temperature of 40° C., with a solution prepared from 21.5 grammes of hydrazoic acid and 200 cubic centimetres of chloroform, the latter solution being added to the former by drops.

About 9 litres of nitrogen and about 18 grammes of carbon dioxide are evolved and allowed to escape, whereupon the sulphuric acid layer is to be diluted and caustic lime added for neutralizing purposes. The tetramethylendiamine, $$NH_2—CH_2—CH_2—CH_2—CH_2—NH_2,$$

formed by the reaction is separated in the form of a benzoyl compound. The yield amounts to 83 per cent of the theoretical efficiency.

The reaction is represented by the following equation:

$$COOH—CH_2—CH_2—CH_2—CH_2—COOH + 2N_3H = NH_2—CH_2—CH_2—CH_2—CH_2—NH_2 + 2N_2 + 2CO_2.$$

Example 4

65.5 grammes of ε-leucin $$NH_2—CH_2—CH_2—CH_2—CH_2—CH_2—COOH$$

dissolved in 130 cubic centimetres of concentrated sulphuric acid are heated to a temperature of 40° C., whereupon a solution of 30 grammes hydrazoic acid in 300 cubic centimetres of chloroform are slowly added by drops to the leucin solution. The further steps of the process are the same as in Example 3 and the resulting pentamethylendiamine $$NH_2—CH_2—CH_2—CH_2—CH_2—CH_2—NH_2$$

is separated either as benzoyl compound or as chloro-hydrate. The yield amounts to 70 per cent of the theory.

The reaction is represented by the following equation:

$$NH_2—CH_2—CH_2—CH_2—CH_2—CH_2—COOH + N_3H = NH_2—CH_2—CH_2—CH_2—CH_2—CH_2—NH_2 + N_2 + CO_2.$$

Example 5

30.5 grammes of acetic acid anhydrid $$CH_3—CO—O—CO—CH_3$$

are mixed with 26 grammes of hydrazoic acid dissolved in 260 cubic centimetres of chloroform and 90 cubic centimetres of concentrated sulfuric acid are gradually added to the mixture by drops. When the evolution of gases ceases caustic alkali is added to the acid in excess and the resulting methylamine $CH_3$—$NH_2$ is distilled off by means of steam. The yield amounts to 85 per cent of the theoretical output.

The reaction is represented by the following equation:

$$CH_3—CO—O—CO—CH_3 + 2N_3H + H_2O = 2CH_3—NH_2 + 2N_2 + 2CO_2.$$

The term "carboxylic acids" as employed in the claims is intended to include the acids and the anhydrides of acids as well.

Example 6

30 grammes of benzoic acid ethylic ester $C_6H_5$—$COOC_2H_5$ are dissolved in 60 cubic centimeters of concentrated sulphuric acid, the solution thus obtained is heated to a temperature of 40° C. and a solution of 8.6 grammes of hydrazoic acid in 100 cubic centimetres of chloroform is slowly added to the former by drops. The aniline $C_6H_5$—$NH_2$ formed is recovered in the same manner as in Example 1. The yield amounts to 30 per cent of the theoretical output.

The reaction is represented by the following equation:

$$C_6H_5—COOC_2H_5 + N_3H + H_2O = C_6H_5—NH_2 + N_2 + C_2H_5—OH + CO_2.$$

Example 7

29 grammes of benzoyl chloride $C_6H_5$—$COCl$ are dissolved in 100 grammes of chloroform containing 8.6 grammes of hydrazoic acid, and heated to a temperature of between 30° and 40° C. when 100 grammes of stannic tetrachloride are added thereto by drops. The reaction having ceased, the inorganic salt is precipitated in the chloroform solution by means of soda and water and subsequently the filtrate is inspissated by evaporation. The residual phenyl-isocyanic ester is split by means of caustic potash and the aniline $C_6H_5$—$NH_2$ then separated by distillation. The yield amounts to 80 per cent of the theoretical output.

This reaction is represented by the following equation:

$$C_6H_5—COCl + N_3H + H_2O = C_6H_5—NH_2 + N_2 + CO_2 + HCl.$$

Our invention is in its broadest aspect not limited to the particular ways or steps described for purposes of exemplification and by which it has been or may be carried into effect, as many changes may be made therein without departing from the main principles of the invention and without sacrificing its chief advantages.

What we claim is:—

1. The process of manufacturing primary amines which comprises reacting a carboxylic compound with hydrazoic acid.

2. The process of manufacturing primary amines which comprises reacting a carboxylic acid with hydrazoic acid in the presence of a catalyst.

3. The process of manufacturing primary amines which comprises reacting a carboxylic ester with hydrazoic acid in the presence of a catalyst.

4. The process of manufacturing primary amines which comprises reacting a carboxylic halide with hydrazoic acid in the presence of a catalyst.

5. The process according to claim 1, in which a catalyst selected from the group consisting of sulphuric acid and tin tetrachloride is employed.

6. The process according to claim 1, in which a catalyst selected from the group consisting of sulphuric acid and tin tetrachloride is employed at a temperature of about 40° C.

7. The process of manufacturing primary amines which comprises reacting benzoic acid with hydrazoic acid at about 40° C. in the presence of concentrated sulphuric acid.

8. The process of manufacturing primary amines which comprises reacting benzoic acid ethylic ester with hydrazoic acid at about 40° C. in the presence of concentrated sulphuric acid.

9. The process of manufacturing primary amines which comprises reacting benzoyl chloride with hydrazoic acid at about 30–40° C. in the presence of stannic tetrachloride.

KARL FRIEDRICH SCHMIDT.
SENTA STRZYGOWSKI.